(12) United States Patent
Watson et al.

(10) Patent No.: US 12,398,826 B2
(45) Date of Patent: Aug. 26, 2025

(54) THREE-DIMENSIONAL TORTUOUS PATH FLOW ELEMENT FOR BALL CONTROL VALVES

(71) Applicant: Control Components, Inc., Rancho Santa Margarita, CA (US)

(72) Inventors: Dan Watson, Rancho Santa Margarita, CA (US); Stephen Freitas, Rancho Santa Margarita, CA (US); Ruben Mendoza, Rancho Santa Margarita, CA (US); Ray Newton, Rancho Santa Margarita, CA (US)

(73) Assignee: Control Components, Inc., Rancho Santa Margarita, CA (US)

( * ) Notice: Subject to any disclaimer, the term of this patent is extended or adjusted under 35 U.S.C. 154(b) by 0 days.

(21) Appl. No.: 16/737,594

(22) Filed: Jan. 8, 2020

(65) Prior Publication Data

US 2021/0207740 A1    Jul. 8, 2021

(51) Int. Cl.
*F16K 47/04* (2006.01)
*F16K 5/06* (2006.01)
*F16K 5/12* (2006.01)
*F16K 47/02* (2006.01)

(52) U.S. Cl.
CPC .......... *F16K 47/045* (2013.01); *F16K 5/0605* (2013.01); *F16K 5/12* (2013.01); *F16K 47/02* (2013.01); *Y10T 137/86751* (2015.04)

(58) Field of Classification Search
CPC ...... F16K 5/0605; F16K 47/045; F16K 47/02; F16K 5/12; Y10T 137/86751
See application file for complete search history.

(56) References Cited

U.S. PATENT DOCUMENTS 3,880,191 A * 4/1975 Baumann .............. F16K 47/045
137/625.32
3,977,435 A   8/1976 Bates
(Continued)

OTHER PUBLICATIONS

Mogus Industries, Inc. "Severe Service Control Valve Solutions," 28 pages. 2016.

(Continued)

*Primary Examiner* — Kenneth Rinehart
*Assistant Examiner* — Christopher D Ballman
(74) *Attorney, Agent, or Firm* — Stetina Garred Brucker & Newboles

(57) ABSTRACT

A fluid control valve includes a valve housing having a fluid inlet and a fluid outlet. A valve body is disposed within the valve housing and is transitional relative to the valve housing between an open position and a closed position. In the closed position, the valve body prevents fluid flow between the fluid inlet and the fluid outlet. The valve body is incrementally transitional from the closed position to the open position to incrementally increase the amount of fluid flow from the fluid inlet to the fluid outlet. A flow control element is positioned within the valve housing downstream of the valve body. The flow control element includes a peripheral body and an inward body having a plurality of flow control passageways extending therethrough. The flow control element additionally includes an opening defined collectively by the peripheral body and the inward body.

20 Claims, 12 Drawing Sheets

(56) References Cited

U.S. PATENT DOCUMENTS

| | | | |
|---|---|---|---|
| 4,295,493 A * | 10/1981 | Bey | F16K 5/0605 138/43 |
| RE31,105 E * | 12/1982 | Bates, Jr. | F16K 3/34 137/625.3 |
| 4,530,375 A * | 7/1985 | Bey | F16K 5/10 137/625.32 |
| 5,113,909 A | 5/1992 | Marin et al. | |
| 5,180,139 A * | 1/1993 | Gethmann | F16K 5/0605 137/625.32 |
| 5,218,984 A | 6/1993 | Allen | |
| 5,332,004 A * | 7/1994 | Gethmann | F16K 5/0605 137/625.32 |
| 5,482,249 A * | 1/1996 | Schafbuch | F16K 47/08 251/118 |
| 5,509,446 A | 4/1996 | Bey | |
| 5,680,889 A * | 10/1997 | Boger | F16K 5/12 137/625.32 |
| 5,771,929 A | 6/1998 | Boger | |
| 5,799,695 A * | 9/1998 | Bey | F16K 5/0605 137/625.32 |
| 5,890,505 A * | 4/1999 | Boger | F16K 5/06 137/1 |
| 5,937,901 A | 8/1999 | Bey | |
| 5,988,586 A * | 11/1999 | Boger | F16K 47/08 138/42 |
| 6,520,209 B1 * | 2/2003 | Lundqvist | F16K 5/0605 137/625.31 |
| 7,011,109 B2 * | 3/2006 | Tran | F16K 5/0605 137/625.32 |
| 7,156,122 B2 * | 1/2007 | Christenson | F16K 5/0605 137/625.32 |
| 7,178,782 B1 | 2/2007 | York | |
| 9,528,632 B2 * | 12/2016 | Glaun | F16K 47/08 |
| 10,036,486 B2 | 7/2018 | Glaun | |
| 10,100,947 B2 * | 10/2018 | Gattavari | F16K 5/0605 |
| 10,221,963 B2 * | 3/2019 | Eilers | F16K 5/06 |
| 2010/0163774 A1 * | 7/2010 | Rimboym | F16K 5/0605 251/315.01 |
| 2010/0258193 A1 | 10/2010 | Christenson et al. | |
| 2016/0102781 A1 | 4/2016 | Glaun | |
| 2016/0341335 A1 * | 11/2016 | Adams | F16K 3/246 |
| 2017/0138507 A1 * | 5/2017 | Kluz | F16K 47/08 |
| 2019/0101229 A1 | 4/2019 | Eilers et al. | |

OTHER PUBLICATIONS

International Search Report for PCT/US2021/012279; mailed Mar. 9, 2021.
First Examination Report for Indian Application No. 202247042840; mailed Aug. 30, 2022.
Extended European Search Report for European Patent Application No. 21738455; mailed Dec. 8, 2023.
Australian Examination Report for Application No. 2021205836; mailed Sep. 25, 2023.
Korean Office Action for Korean Patent Application No. 10-2022-7027364; mailed Nov. 13, 2024.
Australian Office Action for Australian Patent Application No. 2021205836; mailed Jul. 2, 2024.
Chinese Office Action for Chinese Application No. 2021800157472; mailed Jan. 14, 2025.
Korean Office Action for Korean Patent Application No. 10-2022-7027364; mailed Sep. 25, 2024.

* cited by examiner

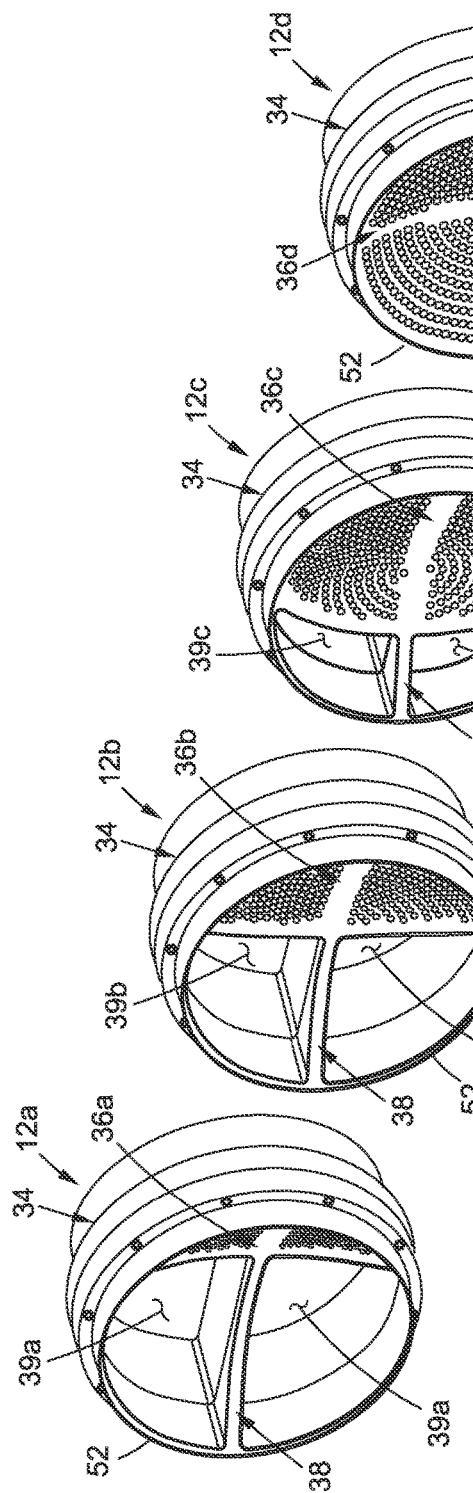
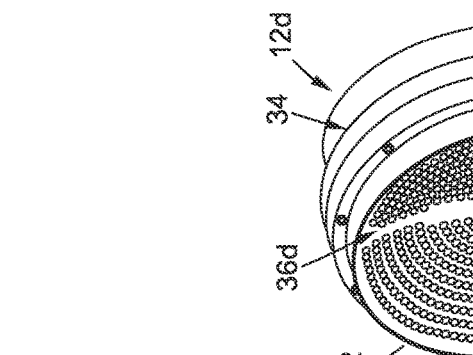
FIG. 7
FIG. 9
FIG. 11
FIG. 13
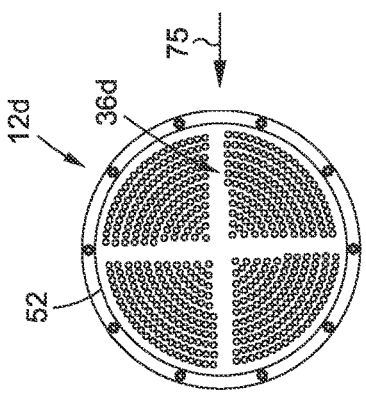
FIG. 8
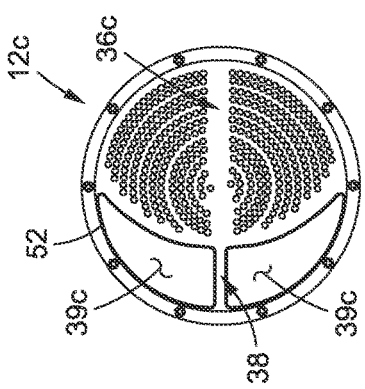
FIG. 10
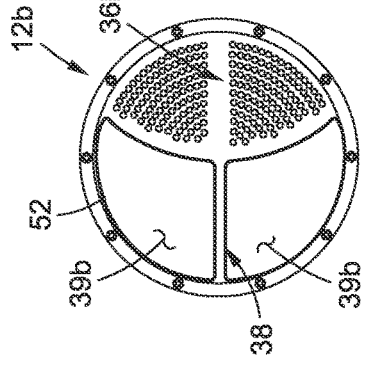
FIG. 12
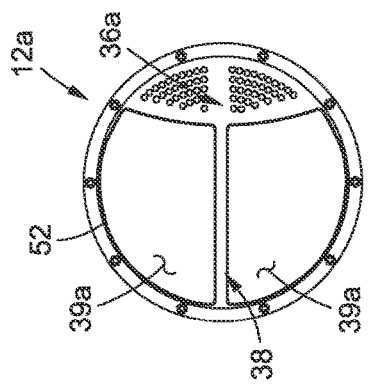
FIG. 14

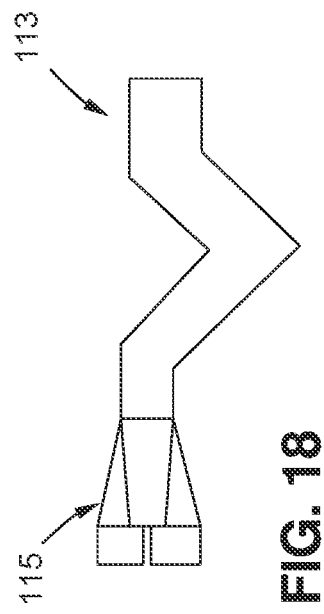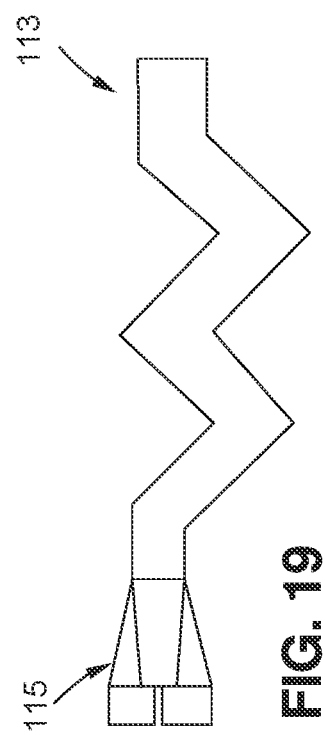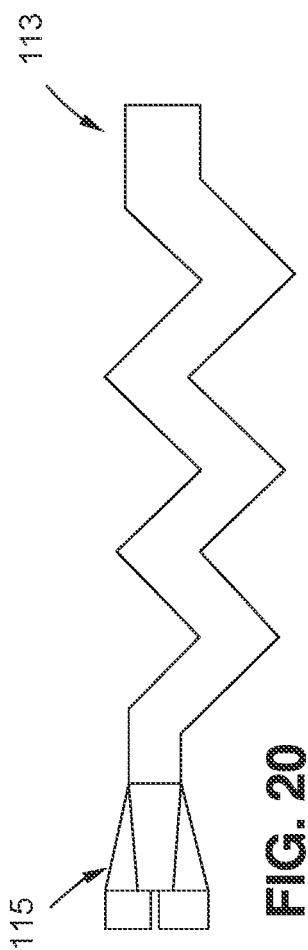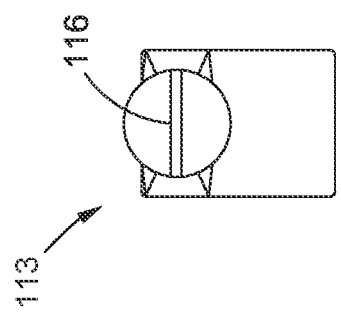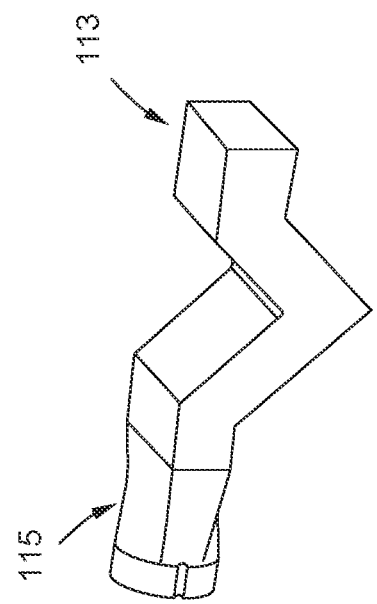

THREE-DIMENSIONAL TORTUOUS PATH FLOW ELEMENT FOR BALL CONTROL VALVES

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Technical Field

The present disclosure relates generally to a flow control element, and more specifically to a flow control element having a plurality of flow control passageways formed therein and specifically configured for use with a ball-type valve body.

2. Description of the Related Art

Linear fluid control valve assemblies are known and are commonly outfitted to include a noise attenuation or impedance assembly. Such valves are often referred to in the relevant industry as drag valves. Prior art linear valves may include an annular impedance assembly which includes a plurality of annular disks, each defining a plurality of radially extending, tortuous flow passages, with the disks being secured to each other in a stacked arrangement. A piston may be disposed within the interior of the impedance assembly and may be cooperatively engaged to an actuator operative to facilitate the reciprocal movement of the piston within the impedance assembly. When the piston is in a lowermost position, none of the passages of the impedance assembly may be exposed to an incoming flow. However, as the piston is moved upwardly toward an open position, flow passes through the passages of the impedance assembly to provide an exit flow through the linear valve. The amount of flow through the impedance assembly may be varied by the position of the piston, which in turn varies the area or proportion of the impedance assembly exposed to the incoming flow within the interior thereof.

Though the above-described linear valve arrangement provides significant noise reduction capabilities, in certain applications it is often desirable to employ the use of a rotary valve utilizing a rotary closure element as an alternative to a linear valve.

Accordingly, there is a need in the art for a flow control element that can achieve desired flow characteristics in a rotary valve utilizing a rotary closure element. Various aspects of the present disclosure address this particular need, as will be discussed in more detail below.

BRIEF SUMMARY

In accordance with one embodiment of the present disclosure, there is provided a fluid control valve comprising a valve housing having a fluid inlet and a fluid outlet. A valve body is disposed within the valve housing and is transitional relative to the valve housing between an open position and a closed position. In the closed position, the valve body prevents fluid flow between the fluid inlet and the fluid outlet. The valve body is incrementally transitional from the closed position to the open position to incrementally increase the amount of fluid flow from the fluid inlet to the fluid outlet. A flow control element is positioned within the valve housing downstream of the valve body. The flow control element includes a peripheral body and an inward body having a plurality of flow control passageways extending therethrough. The flow control element additionally includes an opening defined collectively by the peripheral body and the inward body.

The valve body and the flow control element may be positioned relative to each other such that as the valve body transitions from the closed position toward the open position, fluid flows through at least one of the plurality of flow control passageways prior to fluid flow through the opening.

The valve housing may define a flow axis extending between the fluid inlet and the fluid outlet. At least one of the plurality of flow control passageways may be comprised of a plurality of interconnected segments, with each segment being inclined 45 degrees relative to the flow axis. At least one of the plurality of flow control passageways may include a rectangular cross section in a plane perpendicular to the flow axis. At least one of the plurality of flow control passageways may include a first rectangular cross section in a first plane perpendicular to the flow axis and a second rectangular cross section in a second plane perpendicular to the flow axis, with the second plane being downstream from the first plane and the second rectangular cross section being larger than the first rectangular cross section.

The flow control element may include a concave surface, and the valve body may include a spherical surface complementary to the concave surface of the flow control element.

The peripheral body may define a central axis and each of the plurality of flow control passageways may extend in a direction parallel to the central axis to define a respective length. The lengths of at least two of the plurality of flow control passageways may be different.

The flow control element may be formed as a unitary structure.

According to another aspect of the present disclosure, there is provided a flow control element for use in a fluid control valve. The flow control element includes a peripheral body and an inward body having a concave surface and a plurality of flow control passageways extending into the inward body from the concave surface. The flow control element additionally includes an opening defined collectively by the peripheral body and the inward body.

According to another aspect of the present disclosure, there is provided a fluid control valve comprising a valve housing having a fluid inlet and a fluid outlet. A valve body is disposed within the valve housing and is transitional relative to the valve housing between an open position and a closed position. In the closed position, the valve body prevents fluid flow between the fluid inlet and the fluid outlet. The valve body may be incrementally transitional from the closed position to the open position to incrementally increase the amount of fluid flow from the fluid inlet to the fluid outlet. A flow control element is positioned within the valve housing downstream of the valve body. The flow control element includes an orifice plate having a plurality of passage inlets formed therein and at least one flow opening formed therein. The flow control element additionally includes a main body having a plurality of flow control passageways extending therethrough. The main body is aligned with the orifice plate such that the plurality of passage inlets are in communication with a respective one of the flow control passageways.

The flow control element may additionally include a frame engaged with the orifice plate and the main body.

The main body may include an inlet face and an outlet face spaced from the inlet face along a main body axis. At least one of the plurality of flow control passageways may be comprised of a plurality of interconnected segments, with each segment being inclined 45 degrees relative to the main body axis.

The orifice plate may include a concave surface and the valve body may include a spherical surface complementary to the concave surface of the orifice plate.

The present disclosure will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which:

FIG. 7 is an upper perspective view of one embodiment of a flow control element;

FIG. 8 is a front view of the flow control element depicted in FIG. 7;

FIG. 9 is an upper perspective view of another embodiment of a flow control element;

FIG. 10 is a front view of the flow control element depicted in FIG. 9;

FIG. 11 is an upper perspective view of yet another embodiment of a flow control element;

FIG. 12 is a front view of the flow control element depicted in FIG. 11;

FIG. 13 is an upper perspective view of a further embodiment of a flow control element;

FIG. 14 is a front view of the flow control element depicted in FIG. 13;

FIG. 16 is an end view of an exemplary flow control passageway which may be include in the multi-component flow control element of FIG. 15;

FIG. 17 is an upper perspective view of the flow control passageway depicted in FIG. 16;

FIG. 18 is a front view of the two-stage flow control passageway depicted in FIG. 17;

FIG. 19 is a front view of an exemplary four-stage flow control passageway which may be included in the multi-component flow control element of FIG. 15;

FIG. 20 is a front view of an exemplary six-stage flow control passageway which may be included in the multi-component flow control element of FIG. 15;

Common reference numerals are used throughout the drawings and the detailed description to indicate the same elements.

DETAILED DESCRIPTION

The detailed description set forth below in connection with the appended drawings is intended as a description of certain embodiments of a flow control valve and is not intended to represent the only forms that may be developed or utilized. The description sets forth the various structure and/or functions in connection with the illustrated embodiments, but it is to be understood, however, that the same or equivalent structure and/or functions may be accomplished by different embodiments that are also intended to be encompassed within the scope of the present disclosure. It is further understood that the use of relational terms such as first and second, and the like are used solely to distinguish one entity from another without necessarily requiring or implying any actual such relationship or order between such entities.

Figure 1:
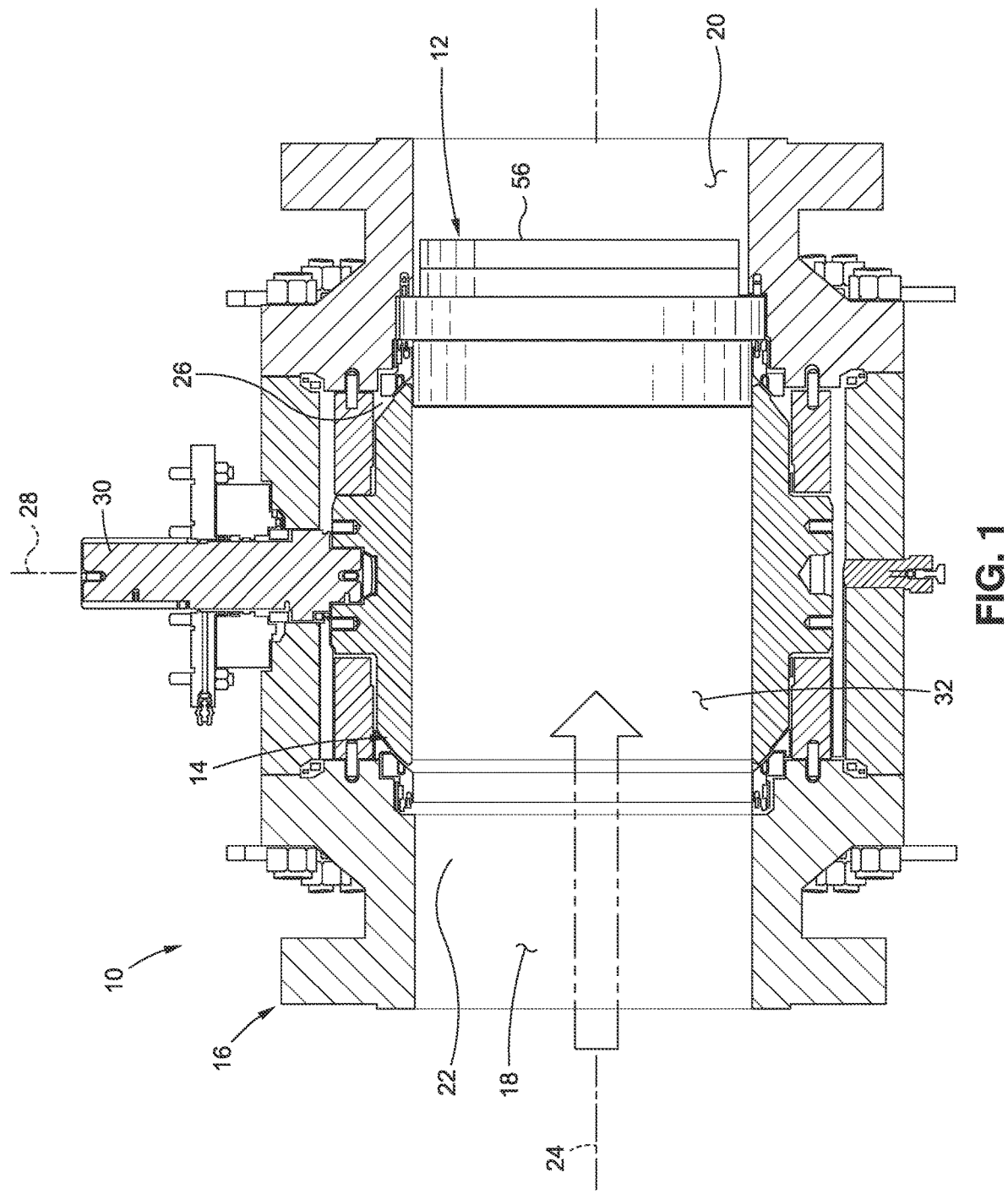
FIG. 1 is a cross-sectional view of a fluid control valve having a ball-type valve body and a downstream flow control element adjacent the ball-type valve body.
Figure 1A:
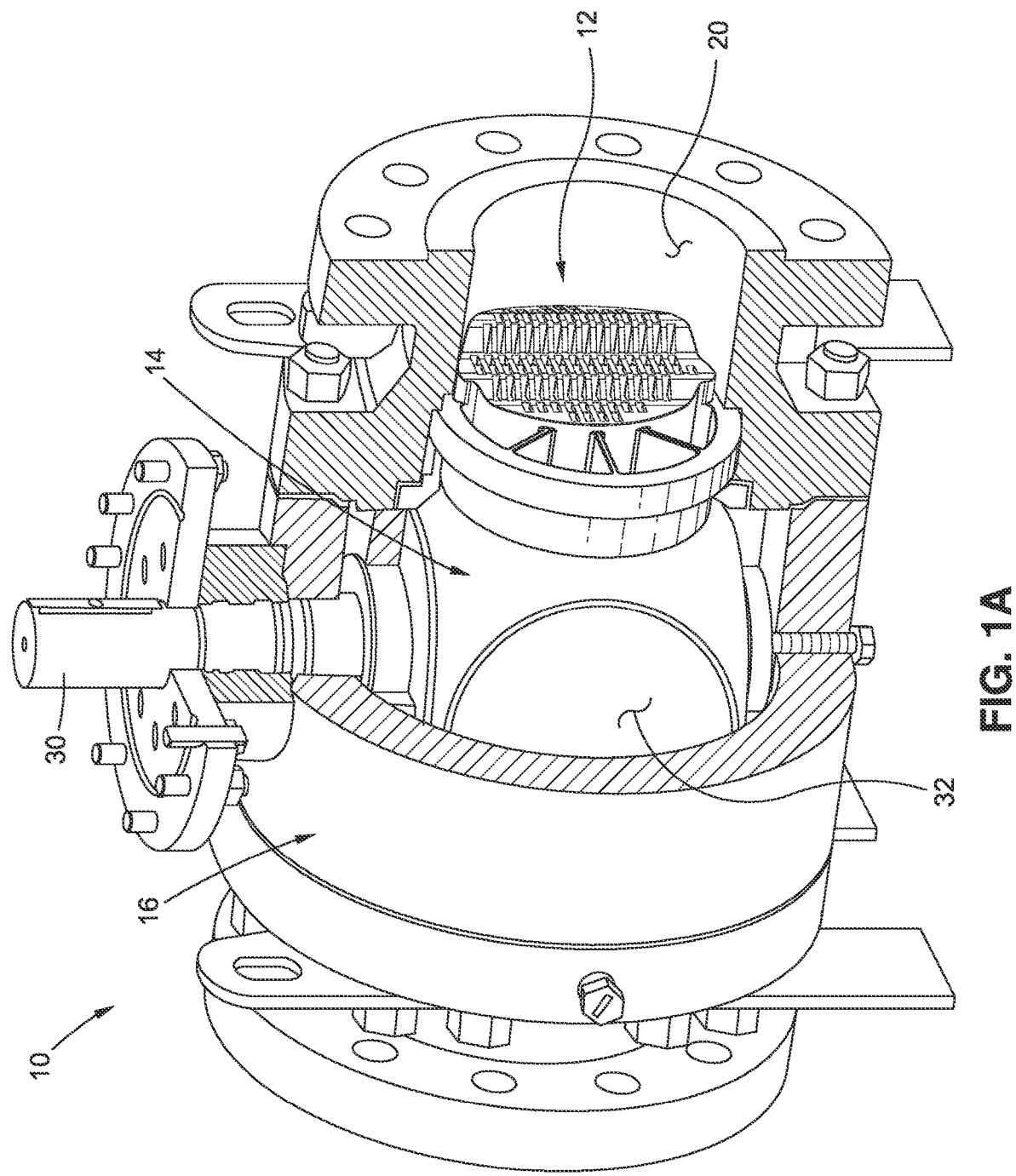
FIG. 1A is an upper perspective, partial cross-sectional view of another embodiment of a fluid control valve having a ball-type valve body and a downstream flow control element adjacent the ball-type valve body.

Referring now to FIGS. 1 and 1A, there is provided a flow control valve 10 having a flow control element 12 and a generally spherical, ball-type valve body 14 or similar rotary closure valve body. The flow control element 12 may be positioned adjacent the valve body 14 and include a surface that may be complementary in shape to the valve body 14. The flow control element 12 may include two regions, including a restricted region having a plurality of tortuous path stages formed therein, and an unrestricted region including an opening to allow for unrestricted flow therethrough. The flow control element 12 may be positioned relative to the valve body 14 such that as the valve body 14 begins to move from a closed position toward an open position, fluid flows initially through the restricted region before fluid flows through the unrestricted region. The flow control element 12 may be formed from additive manufacturing methods (e.g., three-dimensional printing), to allow for an increased flow capacity and/or the number of tortuous path stages therein. In this regard, the flow control valve 10 allows for desired flow control during operation of the valve body 14.

The flow control element 12 and valve body 14 may be disposed within a valve housing 16 having a fluid inlet 18, a fluid outlet 20, and an internal flow path 22 extending therebetween along a flow axis 24. The valve housing 16 additionally includes an internal chamber 26, which houses the valve body 14 and the flow control element 12. As noted above, various aspects of the present disclosure are directed toward the use of a ball-type valve body 14, and thus, the internal chamber 26 may be sized to allow the valve body 14 to rotate about rotation axis 28, which may be perpendicular to the flow axis 24. An actuation stem 30 may be connected to the valve body 14 and may be used control movement of the valve body 14 between the closed and open positions.

The valve body 14 may include a valve flow passage 32 extending therethrough between an inlet opening and an outlet opening. The valve body 14 is transitional relative to the valve housing 16 between an open position and a closed position. In the open position, the inlet opening of the valve body 14 is in fluid communication with the fluid inlet 18 of the valve housing 16, and the outlet opening of the valve body 14 is in fluid communication with the fluid outlet 20 of the valve housing 16. Accordingly, when the valve body 14 is in the open position, fluid may flow from the fluid inlet 18 of the valve housing 16, through the valve body 14, and into the fluid outlet 20 of the valve housing 16. In the closed position, the valve flow passage 32 is moved out of fluid communication with the fluid inlet 18 and fluid outlet 20 of the valve housing 16 so as to prevent fluid flow through the valve body 14. In particular, side walls of the valve body 14 may be moved into alignment with the fluid inlet 18 and fluid outlet 20 of the valve housing 16 to prevent fluid flow through the valve body 14 when the valve body 14 is in the closed position. In one embodiment, the valve body 14 may rotate approximately 90 degrees between the open position and the closed position.

According to one embodiment, the valve body 14 may be incrementally transitional between the closed position and the open position to incrementally control the amount of fluid flowing between the fluid inlet 18 to the fluid outlet 20. In other words, each degree that the valve body 14 moves from the closed position toward the open position may allow for a greater amount of fluid flow from the fluid inlet 18 to the fluid outlet 20. Conversely, each degree that the valve body 14 moves from the open position toward the closed position may allow for a smaller amount of fluid flow from the fluid inlet 18 to the fluid outlet 20.

The flow control element 12 is positioned within the valve housing 16 adjacent the valve body 14. In the exemplary embodiment, the flow control element 12 is downstream of the valve body 14, although it is contemplated that the flow control element 12 may also be incorporated into the valve body 14 in other implementations.

Figure 2:
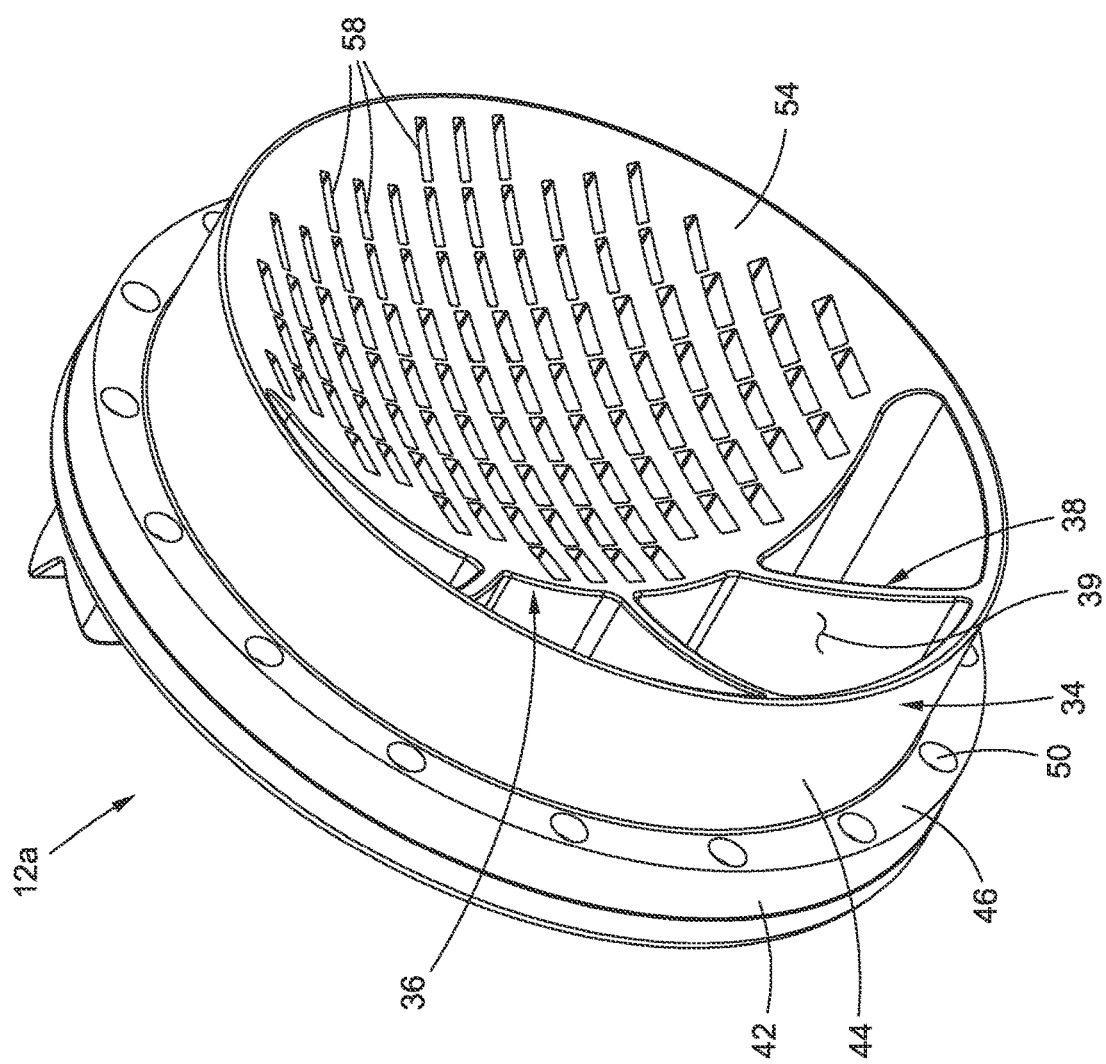
FIG. 2 is an upper perspective view of the flow control element incorporated into the fluid control valve shown in FIG. 1A.
Figure 4:
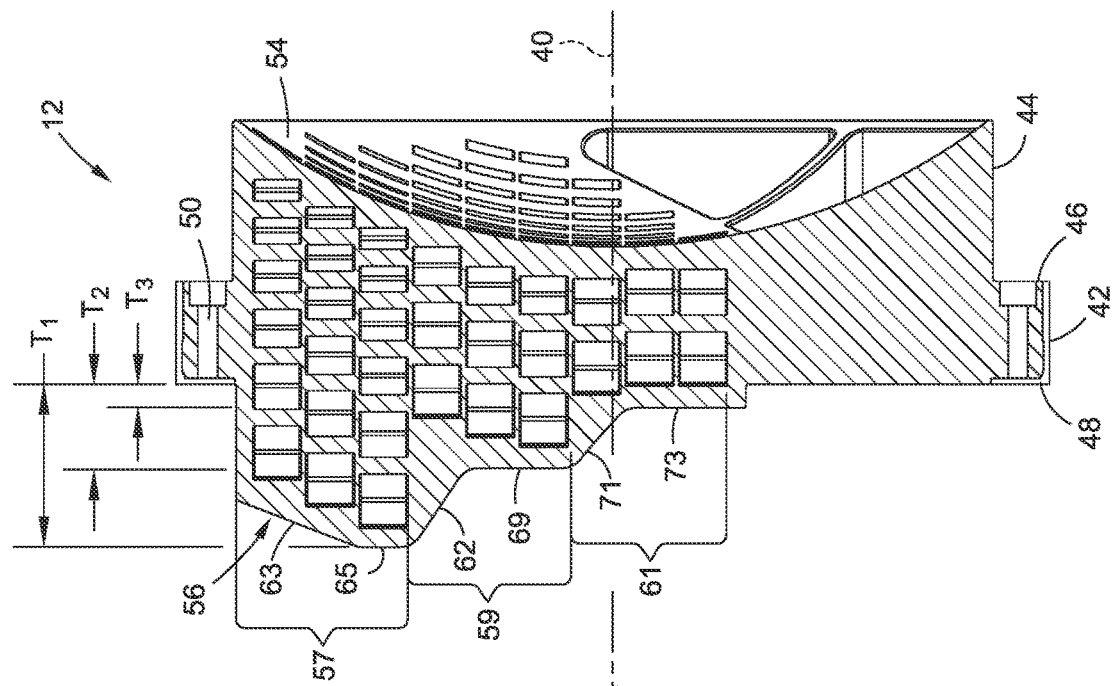
FIG. 4 is a cross-sectional view of the flow control element depicted in FIG. 3.
Figure 3:
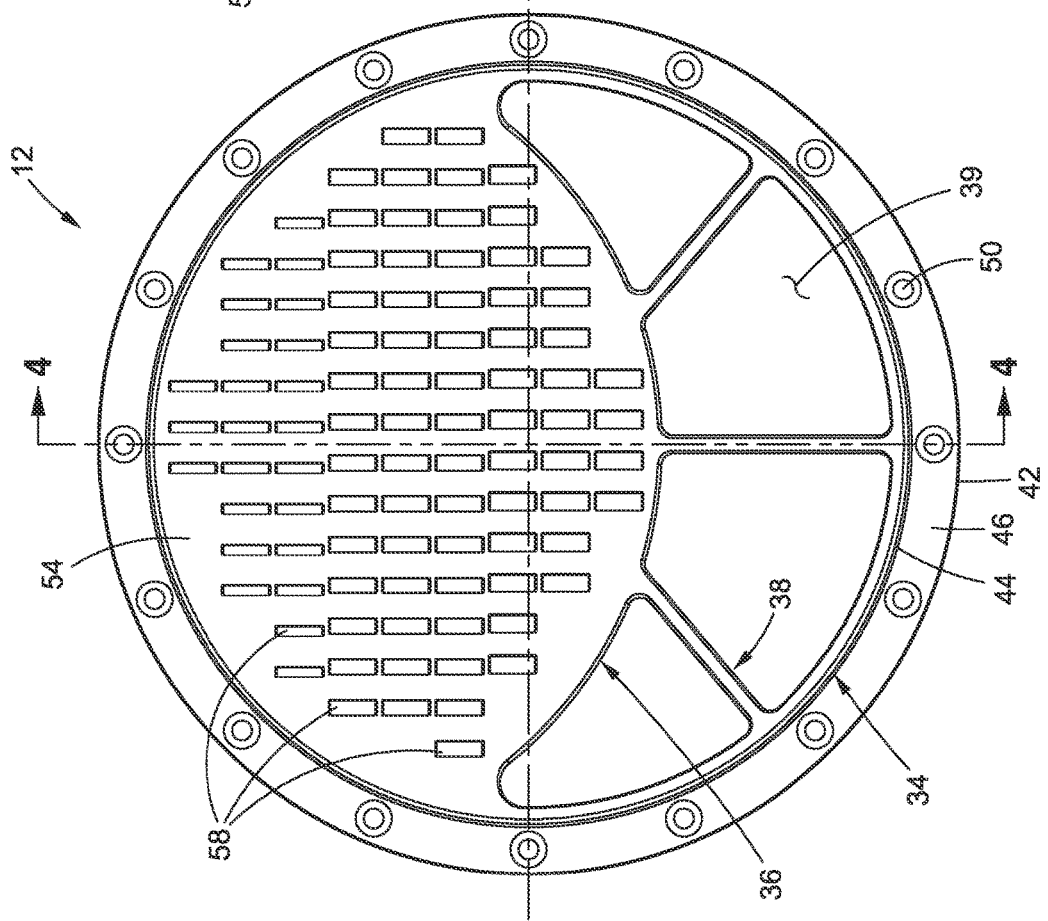
FIG. 3 is a front view of the flow control element depicted in FIG. 2.

The flow control element 12 is shown in more detail in FIGS. 2-4 and includes a peripheral body 34, an inward body 36, and a support rib 38 extending between the peripheral body 34 and the inward body 36. The flow control element 12 may include one or more openings 39 collectively defined by the inward body 36 and the peripheral body 34. In the exemplary embodiment depicted in FIGS. 2-4, the flow control element 12 includes four large openings 39, which are separated by the support rib 38. The inward body 36 may define the restricted region of the flow control element 12, while the openings 39 may define the unrestricted region of the flow control element 12, as will be described in more detail below.

The peripheral body 34 of the flow control element 12 may be disposed about a central axis 40 and include a first outer surface 42 and a second outer surface 44, both of which are circular in configuration, with the second outer surface 44 being smaller in diameter than the first outer surface 42. A shoulder 46 extends between the first and second outer surfaces 42, 44. The first outer surface 42 extends between the shoulder 46 and an end surface 48 opposite the shoulder 46. A plurality of mount openings 50 may extend through the flow control element 12 between the shoulder 46 and the end surface 48. The mount openings 50 may be configured to receive a mechanical fastener, such as a bolt, which may be used for mounting the flow control element 12 to the valve housing 16. The second outer surface 44 may extend from the shoulder 46 and terminate at an outer rim 50, which may define an outer boundary for fluid flow, as will be described in more detail below.

The inward body 36 extends radially inward from at least a portion of the peripheral body 34. The inward body 36 includes an upstream surface 54 and a downstream surface 56 opposite the upstream surface 54. A plurality of flow control passageways 58 may extend through the inward body 36 between the upstream surface 54 and the downstream surface 56. In the embodiment depicted in FIGS. 2-4, the flow control passageways 58 are arranged in a rectangular grid arrangement, e.g., aligned in rows and columns. The upstream surface 54 may be concave and may be configured to interface with the outer contour of the ball-type valve body 14. In this regard, at least a portion of the outer surface of the ball-type valve body 14 may be of a spherical configuration (e.g., convex), and thus, the concave configuration of the upstream surface 54 may be complementary to the spherical configuration of the ball-type valve body 14.

As shown in FIG. 4, the downstream surface 56 may define a stepped configuration, with the spacing between the downstream surface 56 and the end surface 48 varying along the downstream surface 56. In the embodiment depicted in FIG. 4, the downstream surface 56 includes a first region 57, a second region 59, and a third region 61. From the perspective shown in FIG. 4 and starting at the top of the downstream surface 56, the first region 57 includes an outwardly angled segment 63 which transitions into a parallel segment 65 that is parallel to the end surface 48. The distance between the parallel segment 65 of the first region 57 and the end surface 48 defines a first thickness $T_1$. The second region 59 includes an inwardly angled segment 67 which transitions into a parallel segment 69 that is parallel to the end surface 48. The distance between the parallel segment 69 of the second region 59 and the end surface 48 defines a second thickness $T_2$. The third region 61 includes an inwardly angled segment 71 which transitions into a parallel segment 73 that is parallel to the end surface 48. The distance between the parallel segment 73 of the third region 61 and the end surface 48 defines a third thickness $T_3$. The first thickness $T_1$ is greater than the second thickness $T_2$, which is greater than the third thickness $T_3$. The variation in thickness may allow for a variation in the length of the passageways extending through the flow control element 12a. Therefore, a given flow control element 12a may be capable of inducing a pressure drops that vary in magnitude based on the fluid passageway through which the fluid flows.

It is also contemplated that other embodiments of the flow control element may have a downstream surface that is not stepped. For instance, the downstream surface 56 may have a spherical, convex configuration.

Figure 5:
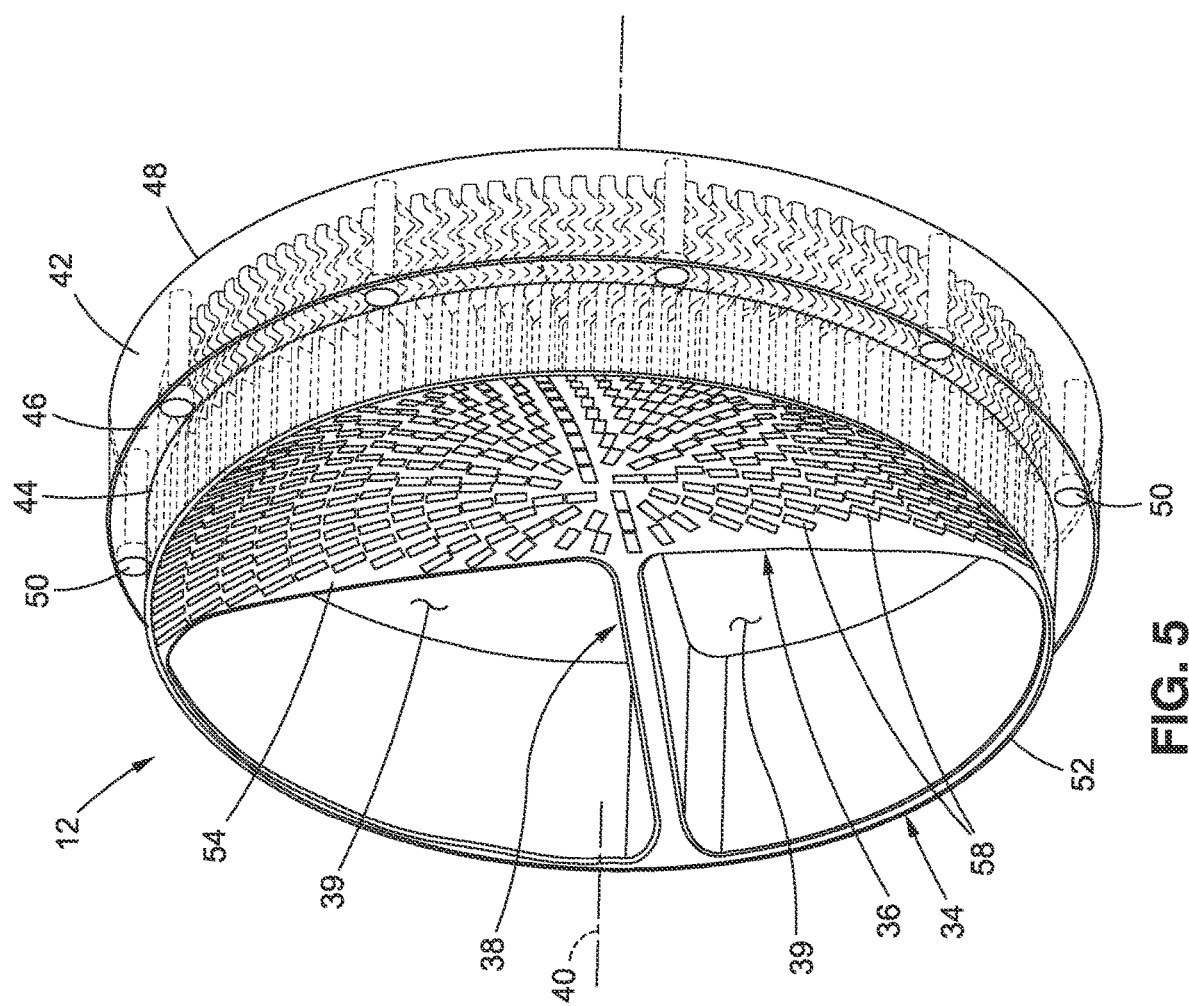
FIG. 5 is a lower front perspective view of the flow control element, with a plurality of internal flow control passageways thereof being depicted in phantom.

FIG. 5 is a lower perspective view of another embodiment of a flow control element 12 which may include a pair of larger openings 39 and a plurality of flow control passageways 58 arranged in a polar coordinate configuration, e.g., the openings of the flow control passageways 58 are aligned along respective radii extending from central axis 40.

In a given flow control element 12, the length of the flow control passageways 58 may be defined by the distance along the passageway 58 between the upstream surface 54 and the downstream surface 56. With the configuration of the upstream surface 54 being primarily dictated by the outer contour of the valve body 14, the configuration of the downstream surface 56 may be dictated by a desired length of the flow control passageways 58. Thus, the downstream surface 56 may be convex, concave, planar, stepped, or other configurations known in the art to achieve a desired length of the flow control passageways 58.

The flow control passageways 58, which each extend between the upstream surface 54 and the downstream surface 56, as indicated above, are designed to impart a pressure drop on the fluid flowing therethrough. Accordingly, each flow control passageway 58 may include a series of bends or turns to define a tortuous configuration. The series of bends or turns may define one or more stages in the passageway 58, with adjacent stages being separated by a turn or bend. In a given passageway 58, increasing the number of stages allows for a larger pressure drop to be achieved by the fluid flowing through the passageway 58.

Figure 6:
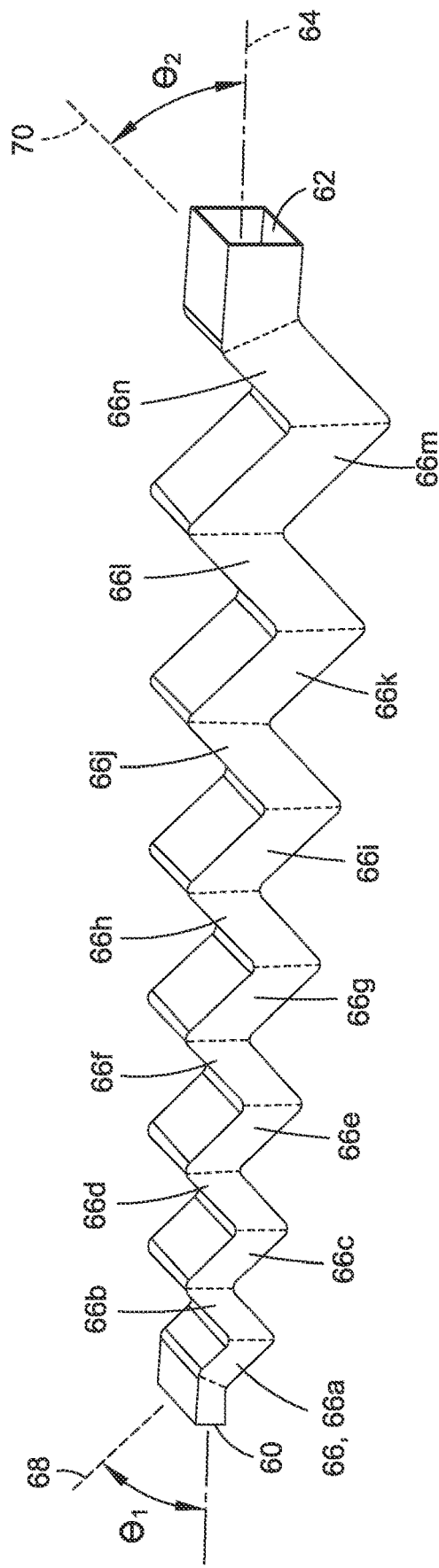
FIG. 6 is a perspective view of an exemplary flow control passageway formed in the flow control element.

FIG. 6 is an upper perspective view of a flow control passageway 58 isolated by itself (e.g., now shown in the flow control element 12) to depict an exemplary configuration thereof. The flow control passageway 58 includes an inlet 60 and an outlet 62, with the flow control passageway 58 extending between the inlet 60 and the outlet 62 along a passageway axis 64. According to one embodiment, the flow control passageway 58 may be comprised of a plurality of interconnected segments 66. In the embodiment depicted in FIG. 6, the flow control passageway 58 includes 14 segments 66a-n. Each segment 66 may be inclined relative to the passageway axis 64 by an angle. Elements 66a, 66c, 66e, 66g, 66i, 66k, 66m extend in a direction parallel to axis 68, while elements 66b, 66d, 66f, 66h, 66j, 66l, 66n extend in a direction parallel to axis 70. Axis 68 is angled relative to the passageway axis 64 by an angle $\Theta_1$, while axis 70 is angled relative to the passageway axis 64 by an angle $\Theta_2$. The magnitudes of $\Theta_1$ and $\Theta_2$ may vary between 0 and 90 degrees, although in the embodiment depicted in FIG. 6, the magnitude of $\Theta_1$ and $\Theta_2$ is approximately 45 degrees. Thus, each segment 66 is inclined 45 degrees relative to the passageway axis 64.

The flow control passageways 58 may include a rectangular cross section in a plane perpendicular to the passageway axis 64. Furthermore, the cross-sectional size of the flow control passageways 58 may increase along the length of the flow control passageway 58 from the inlet 60 to the outlet 62. In other words, the flow control passageway 58 may define a first rectangular cross section in a first plane perpendicular to the passageway axis 64 and a second rectangular cross section in a second plane perpendicular to the passageway axis 64, with the second plane being downstream from the first plane and the second rectangular cross section being larger than the first rectangular cross section.

The inward body 36 may be configured such that the lengths of the flow control passageways 58 may vary. For instance, the lengths of the flow control passageways 58 that are a common radial distance from the central axis 40 may be equal. Thus, the flow control passageways 58 positioned closer to the central axis 40 may be shorter in length to the flow control passageways 58 positioned farther away from the central axis 40. An example of this configuration is shown in FIG. 4 which shows a group of six-stage flow control passageways 58 furthest away from the central axis 40, then a group of three-stage flow control passageways 58 closer to the central axis 40, and then a group of two-stage passageways 58 closest to the central axis 40. In an alternative embodiment, the length of the passageways 58 may vary along a prescribed diameter of the peripheral body 34. For instance, the flow control passageways 58 may be longer at the bottom of the flow control element 12 and shorter at the top, or vice versa, or alternatively, the flow control passageways 58 may be longer at one side of the flow control element 12 and shorter at the opposing side or vice versa. Along these lines, those of ordinary skill in the art will recognize that the longer the flow control passageway 58, the greater the ability to potentially increase the number of turns or stages defined thereby (and hence the energy dissipation capacity thereof). In summary, the lengths of the flow control passageways 58 and/or the number of stages defined thereby may vary according to any scheme or pattern as may be desired to effectuate a desired flow characteristic, e.g., a desired pressure drop in fluid flowing therethrough. Exemplary arrangements of the flow control passageways 58 in the context of a presently contemplated functional characteristic of the flow control element 12 within the flow control valve 10 will be discussed in more detail below.

Referring now to FIGS. 7-14, there is depicted several different embodiments of the flow control element 12, with the primary distinction between the embodiments being the sizes of the inward body 36 (e.g., the restricted region) and the openings 39 (e.g., the unrestricted region) extending within the peripheral body 34. In this regard, the relative surface area percentages of the flow control element 12 assumed by the inward body 36 and the opening(s) 39 may vary depending on the desired flow characteristics. FIGS. 7 and 8 show a first embodiment of the flow control element 12a, wherein the inward body 36a is the smallest of those flow control elements 12a-d depicted in FIGS. 7-14, while the collective sizes of the openings 39a is the largest of those depicted in FIG. 7-14. More specifically, the inward body 36a constitutes less than half of the area defined by the outer rim 52, while the openings 39a collectively constitute more than half of the area defined by the outer rim 52.

FIGS. 9 and 10 depict a second embodiment of the flow control element 12b, wherein the inward body 36b constitutes approximately half of the area defined by the outer rim 52, and the openings 39b collectively constitute approximately half of the area defined by the outer rim 52.

FIGS. 11 and 12 depict a third embodiment of the flow control element 12c, wherein the inward body 36c constitutes more than half of the area defined by the outer rim 52, and the openings 39c collectively constitute less than half of the area defined by the outer rim 52.

FIGS. 13 and 14 depict a fourth embodiment of the flow control element 12d, wherein the inward body 36d extends across the entirety of the area defined by the outer rim 52, thus leaving no remaining area for any openings 39.

When placed in the valve housing 16, the flow control element 12 may be positioned relative to the valve body 14 such that as the valve body 14 transitions from the closed position toward the open position, fluid flows through at least one of the plurality of flow control passageways 58 prior to fluid flow through the openings 39. Accordingly, as the valve body 14 transitions from the closed position toward the open position, the valve flow passage 32 of the valve body is first brought into alignment with the inward body 36, while the openings 39 remain out of alignment with the valve flow passage 32 of the valve body 14. Accordingly, fluid may flow through at least some of the flow passageways 58, while fluid flow through the openings 39 remains restricted. It is contemplated that when the valve body 14 is only slightly moved from the closed position toward the open position, only a small percentage of the passageways 58 may be in communication with the valve flow passage 32, and thus, only a small percentage of the passageways 58 may have fluid flowing therethrough.

As the valve body 14 continues toward the open position, a greater percentage of the inward body 36 may be brought into alignment with the valve flow passage 32, which in turn, may increase the number of flow control passageways 58 receiving fluid therefrom.

As the valve body 14 further continues toward the open position, the openings 39 (if included) may be brought into alignment with the valve flow passage 32. When such alignment occurs, fluid may flow through the openings 39, while also flowing through the flow control passageways 58. The openings 39 allow for unimpeded fluid flow therethrough, whereas the flow control passageways 58 provide resistance in the form of the multi-stage configuration thereof. Accordingly, turndown and noise performance of the ball-type flow control valve 10 may be improved in various flow control applications.

The configuration of the flow control element 12 may be designed to control or regulate the fluid pressure/velocity when the valve body 14 opens. Oftentimes, the pressure/velocity of the fluid at the initial opening of the valve body 14 is of greater magnitude (and greater concern), than the pressure/velocity of the fluid when the valve body 14 is completely open. Thus, the flow control passageways 58 may be configured and arranged to provide a greater degree of energy attenuation immediately at the opening of the valve body 14, with those energy attenuating attributes decreasing as the valve body 14 continues to transition to its fully open position, eventually culminating in at least a portion of the flow control element 12 (e.g., those portions defined by the openings 39) providing virtually no flow restriction when the valve body 14 is completely open.

By way of example, and using the perspectives shown in FIGS. 8, 10, 12, and 14 the right-most region of the flow control element 12 may receive the fluid at greatest pressure/velocity as the fluid exits the valve body 14 at initial opening. Thus, those flow control passageways 58 within this region (considering the structural attributes of the flow control element 12 shown and described above in relation to FIG. 4) may be greater in length and may further define the greatest number of stages (and hence energy attenuating capability). As valve flow passage 32 of the valve body 14 moves across the flow control element 12 in the direction of arrow 75, which occurs as the valve body 14 gradually transitions toward its fully open position, the flow control passageways 58 arranged inwardly from the right-most region toward the axis 24 will progressively be exposed to fluid flow. As it is contemplated that less energy attenuating capacity may be needed when the valve body 14 is opened to the corresponding degree, these particular flow controls passageways 58, which are typically slightly shorter in length and/or have fewer stages than those that are located within the right-most region, will thus provide a comparatively reduced level of energy attenuation. The trend of shorter flow control passageways 58 and/or fewer stages (and hence reduced energy attenuation capability) may continue as the valve flow passage 32 continues along the direction of arrow 75. Eventually, as the valve body 14 approaches its fully open position, its valve flow passage 32 may communicate with the opening(s) 39 (if included) in the flow control element 12 to allow for unimpeded fluid flow with virtually no energy attenuation being facilitated by such opening(s).

With regard to the embodiment depicted in FIGS. 13 and 14, while the flow control element 12d may be formed without any one or more openings 39, the flow control passageways 58 positioned adjacent the left-most region, may be formed to be of the shortest in length, or may have no turns despite being of the greatest length, to comparatively reduce their energy attenuating capability. Along these lines, fluid flow through such left-most flow control passageways 58 may only occur when the valve body 14 is completely open, and thus, the energy attenuating needs for these particular flow control passageways 58 may be lower than for those flow control passageways 58 exposed to fluid flow at the initial opening of the valve body 14.

The unique configuration of the flow control element 12, and in particular, the complex configuration of the flow control passageways 58, may be made possible by additive manufacturing or three-dimensional printing, wherein the flow control element 12 is formed in successive layers to form a unitary structure. Conventional flow control elements, particularly those used in connection with ball-type valve bodies, typically included a series of stacked plates to define flow control passageways. However, the stacked plate arrangement was associated with inherent limitations as to the complexity of the flow control passageways defined thereby. Accordingly, the ability to create complex flow control passageways 58 with accuracy and precision via additive manufacturing presents a significant improvement over conventional stacked plate flow control elements. An example of an additive manufacturing technique is direct metal laser sintering (DMLS), which is described in U.S. Pat. No. 8,826,938 entitled Direct Metal Laser Sintered Flow Control Element, the disclosure of which is incorporated herein by reference. Other three-dimensional printing or manufacturing techniques known in the art may also be used without departing from the spirit and scope of the present disclosure.

Figure 15:
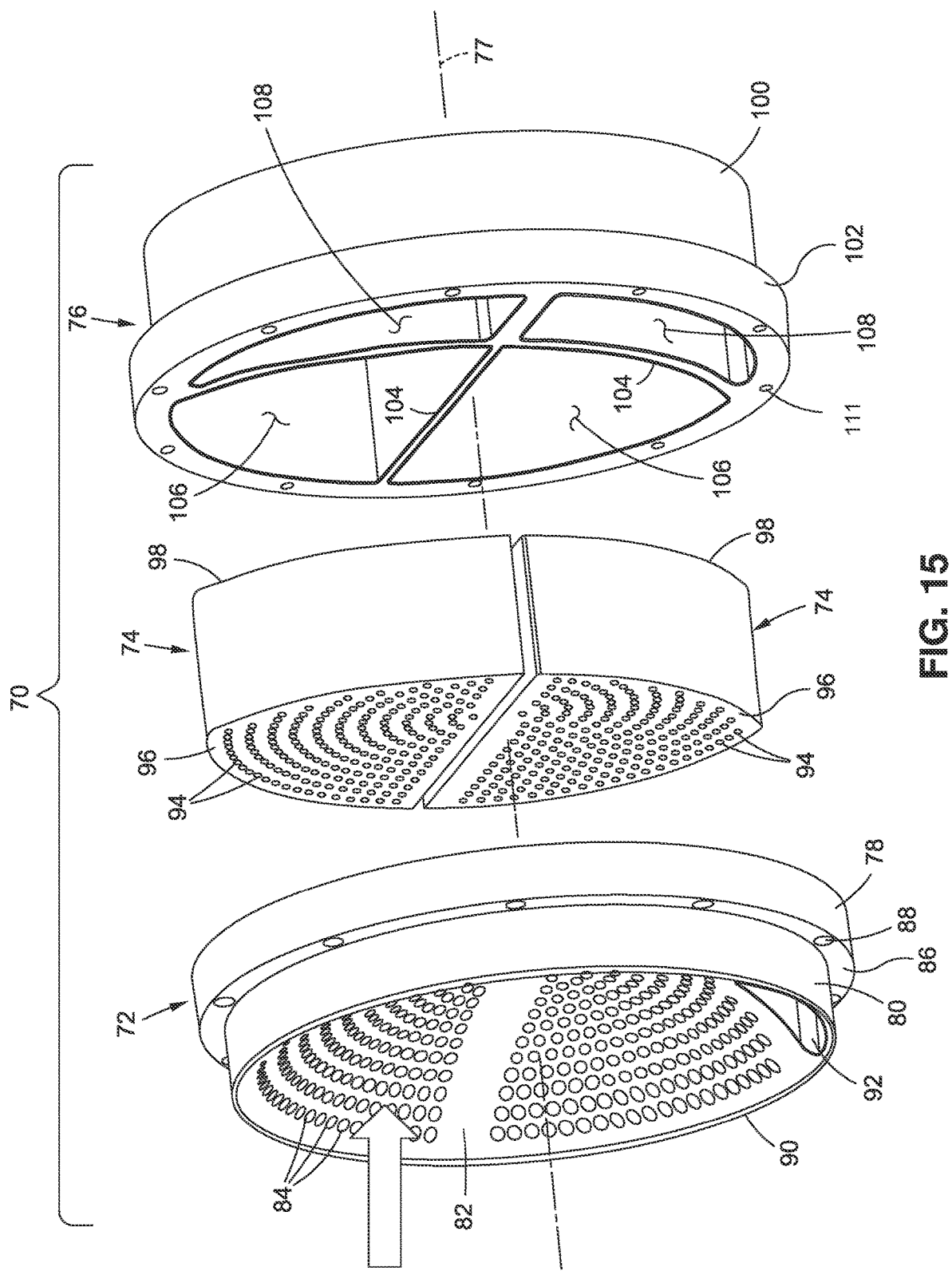
FIG. 15 is an exploded upper perspective view of a multi-component flow control element.

For larger flow control elements, three-dimensional printing of the flow control element as a single unitary structure may not be feasible, and thus, alternative embodiments of the flow control element may include a multi-component structure. An example of a multi-component flow control element 70 is depicted in FIG. 15 and generally includes an orifice plate 72, at least one main body 74, and a frame 76, with the flow control element 70 being disposed about a central axis 77. The orifice plate 72 includes first outer surface 78, a second outer surface 80, and an upstream surface 82 having a plurality of passage inlets 84 formed therein. Both the first and second outer surfaces 78, 80 may be circular in configuration, with the second outer surface 80 being smaller in diameter than the first outer surface 78. A shoulder 86 may extend between the first and second outer surfaces 78, 80, with the shoulder 86 including a plurality of mount openings 88 formed therein. The second outer surface 80 may extend from the shoulder 86 and terminate at an outer rim 90, which may define an outer boundary for fluid flow. The upstream surface 82 may be concave in configuration so as to interface with the ball-type valve body 14 having the spherical outer surface configuration. The upstream surface 82 and the second surface 80 may collectively define a flow opening 92 which allows for unrestricted fluid flow therethrough. One or more support ribs may extend between the second surface 80 and the upstream surface 82 and may separate adjacent flow openings.

The flow control element 70 shown in FIG. 15 includes two main bodies 74, each of which include a plurality of flow control passages 94 extending therethrough. In this regard, each main body 74 includes a first surface 96 and a second surface 98 opposite the first surface 96, with the flow control passages 94 extending from the first surface 96 to the second surface 98. Each main body 74 may be aligned relative to the orifice plate 72 such that the plurality of passage inlets 84 of the orifice plate 72 may be in fluid communication with a respective one of the flow control passages 94.

The frame 76 may support the main bodies 74 and the orifice plate 72. The frame 76 may include an outer wall 100 and a flange 102 extending radially outward from the outer wall 100. The frame 76 may additionally include one or more support walls 104 for defining body support openings 106 sized to receive respective ones of the main bodies 74. The number of body support openings 106 may be equal to the number of main bodies 74. Although the exemplary embodiment shows two body support openings 106 and two main bodies 74, it is understood that some embodiments may include only one body support opening 106 and one main body 74, while other embodiments may include more than two body support openings 106 and more than two main bodies 74. The support walls 104 and the outer wall 100 may also collectively define one or more flow openings 108, which may be placed in communication with the flow openings 92 on the orifice place 72. The flange 102 may include a plurality of mount openings 111 extending therethrough, and alignable with the mount openings 88 on the orifice plate 72 to facilitate assembly of the flow control element 70 and attachment of the flow control element 70 to the valve housing 16. Assembly of the flow control element 70 may entail placement of the main bodies 74 in the body support openings 106 of the frame 76 and placement of the orifice plate 72 over the frame 76. In this regard, the first outer surface 78 of the orifice plate 72 may be placed over the flange, while the shoulder 86 on the orifice plate 72 may be placed in contact with the flange 102.

With further regard to FIG. 15, a variant of the flow control element 70 is contemplated wherein the orifice plate 72 is eliminated from the assembly. In greater detail, it is envisioned that the main bodies 74 may be fabricated in a manner wherein, when integrated into the frame 76, the first surfaces 96 thereof collectively define an arcuately contoured, generally concave surface, the profile of which generally approximates that portion of the upstream surface 82 of the orifice plate 72 including the passage inlets 84 therein. In other words, when the main bodies 74 are mechanically retained within the frame 76, the convex surface collectively defined thereby may directly interface with the concave surface of the ball 14.

Referring now to FIGS. 16-20, there is shown various views of exemplary flow control passageways 113 that may be incorporated into the flow control element 70. Each flow control passageway 113 may be collectively defined by a passage inlet 84 on the orifice plate 72 and the flow control passages 94 in the main bodies 74. As can be seen, the flow control passageways 113 may include a main portion that defines a rectangular cross-sectional shape, and which may increase in size along the length of the flow control passageway 113 from the inlet to the outlet. FIG. 18 shows a two-stage passageway 112, FIG. 19 shows a four-stage passageway 113, and FIG. 20 shows a six-stage passageway 113. Furthermore, each of the flow control passageways 113 may additionally include a geometric loft 115 at the inlet end portion thereof. The loft 115 may provide a smooth transition between a round inlet opening and a rectangular flow path. The inlet end portion of the loft 115 may also include one or more inlet splitter plates 116. The splitter plates 116 may extend diametrically across the inlet opening and prevent the passage and collection of large particulate into the throat of the geometric loft 115.

Those of ordinary skill in the art will recognize that the various structural features of the flow control element 70 may be formed and assembled such that the resultant flow control element 70 mirrors the progressively reduced energy attenuating characteristics of the flow control element 12 as described above as valve body 14 gradually transitions from its fully closed position to its fully open position.

Although the foregoing describes the various flow control elements as being separate from the valve body 14, it is contemplated that in certain embodiments, a flow control element may be mounted directly to the valve body 14 or formed in conjunction with the valve body 14. FIGS. 21-24 depict an example of a flow control valve 110 having a flow control element 112 and a generally spherical, ball-type valve body 114. In this regard, when mounted to, or formed as part of the valve body 114, the flow control element 112 moves with the valve body 114 between its closed and open positions. Furthermore, incremental movement of the valve body 114 between the closed and open positions may allow for incremental exposure of the flow control passageways formed in the flow control element 112 to fluid flow.

Figure 23:
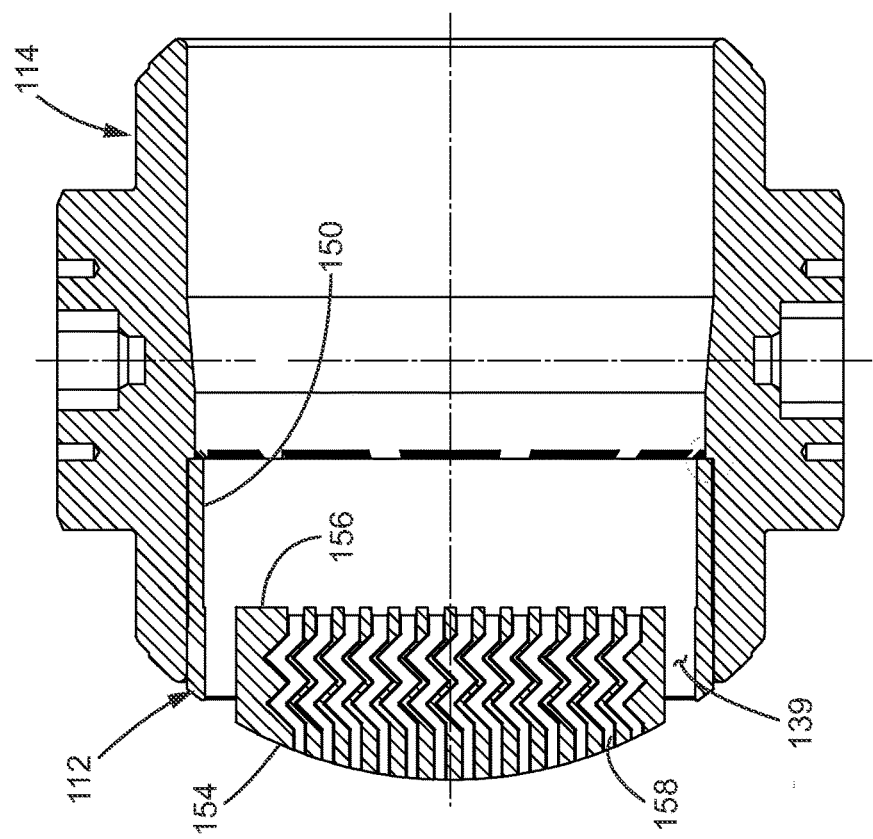
FIG. 23 is a cross-sectional view of the ball-type valve body and integrated flow control element of FIG. 22.
Figure 22:
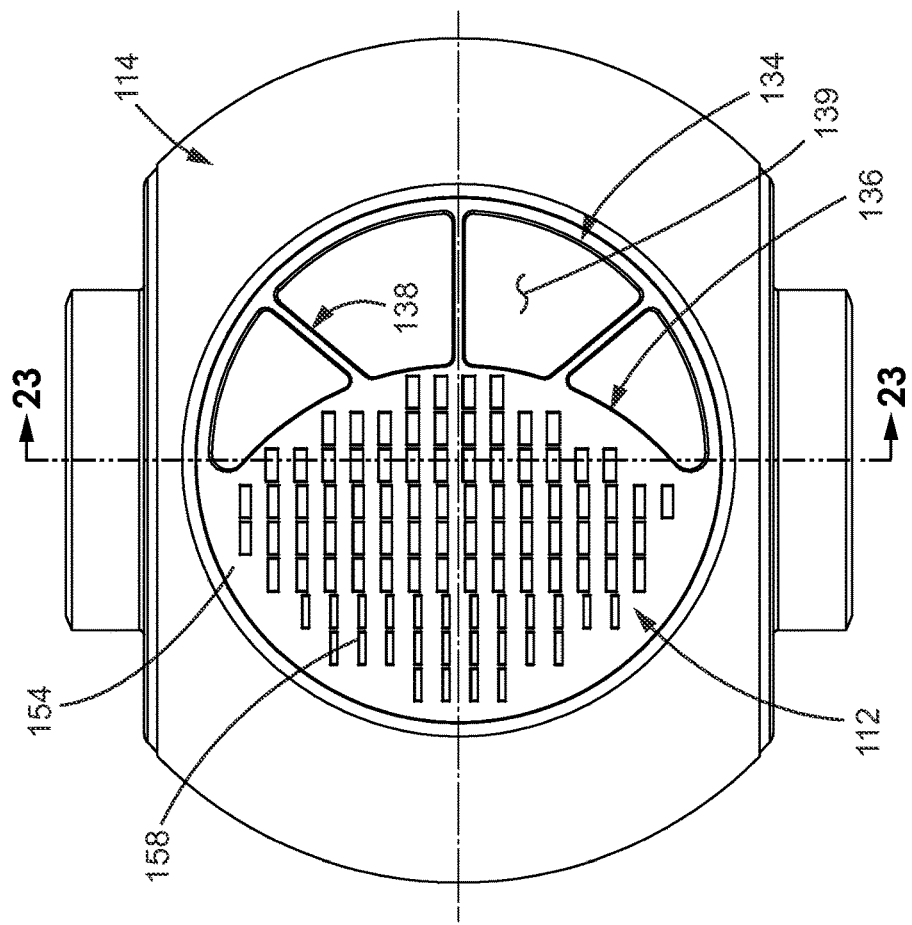
FIG. 22 is a front view of the ball-type valve body having the integrated flow control element.
Figure 24:
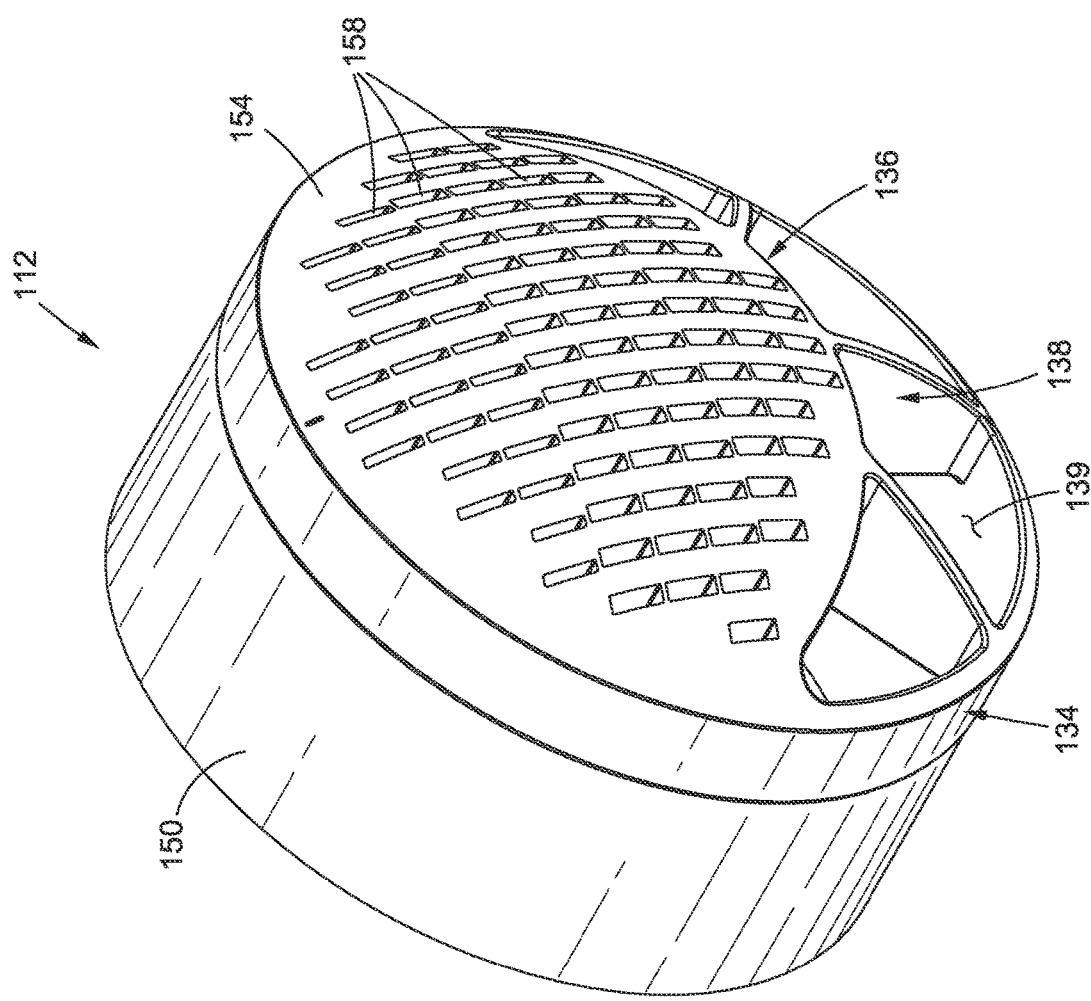
FIG. 24 is an upper perspective view of the flow control element shown in FIGS. 21-23.

FIGS. 22 and 23 show the flow control element 112 integrated into the valve body 114, while FIG. 24 shows the flow control element 112 by itself. The flow control element 112 shares several structural attributes with the flow control element 12 discussed above. More specifically, the flow control element 112 includes a peripheral body 134, an inward body 136, and a support rib 138 extending between the peripheral body 134 and the inward body 136. The flow control element 112 may include one or more openings 139 collectively defined by the inward body 136 and the peripheral body 134. A plurality of flow control passageways 158 may extend through the inward body 136 between an upstream surface 154 and a downstream surface 156.

A unique feature of the in-ball flow control element 112 is the skirt or extended annular wall 150, which allows for attachment of the flow control element 112 to the valve body 114. In particular, the annular wall 150 may include an outer surface defining an outer diameter that is substantially equal to, yet slightly smaller than the inner diameter defined by the valve body 114. In this regard, the annular wall 150 may be configured to provide an interference fit with the valve body 114, or alternatively, mechanical fasteners may be used to secure the flow control element 112 to the valve body 114.

The flow control element 112 may be coupled to an inlet side of the valve body 114, such that fluid entering the valve body 114 initially passes through the flow control element 112 and then continues through the valve body 114. From the perspective shown in FIG. 21, the valve body 114 is shown in a closed position, and rotates in the direction of arrow 125 to transition from the closed position toward the open position. The flow control element 112 may be configured such that the longer flow control passageways 158 are first to receive fluid as the valve body 114 transitions from a closed position toward an open position, and then shorter flow control passageways 158 are subsequently exposed to the fluid flow as the valve body 114 continues toward the open position.

Figure 21:
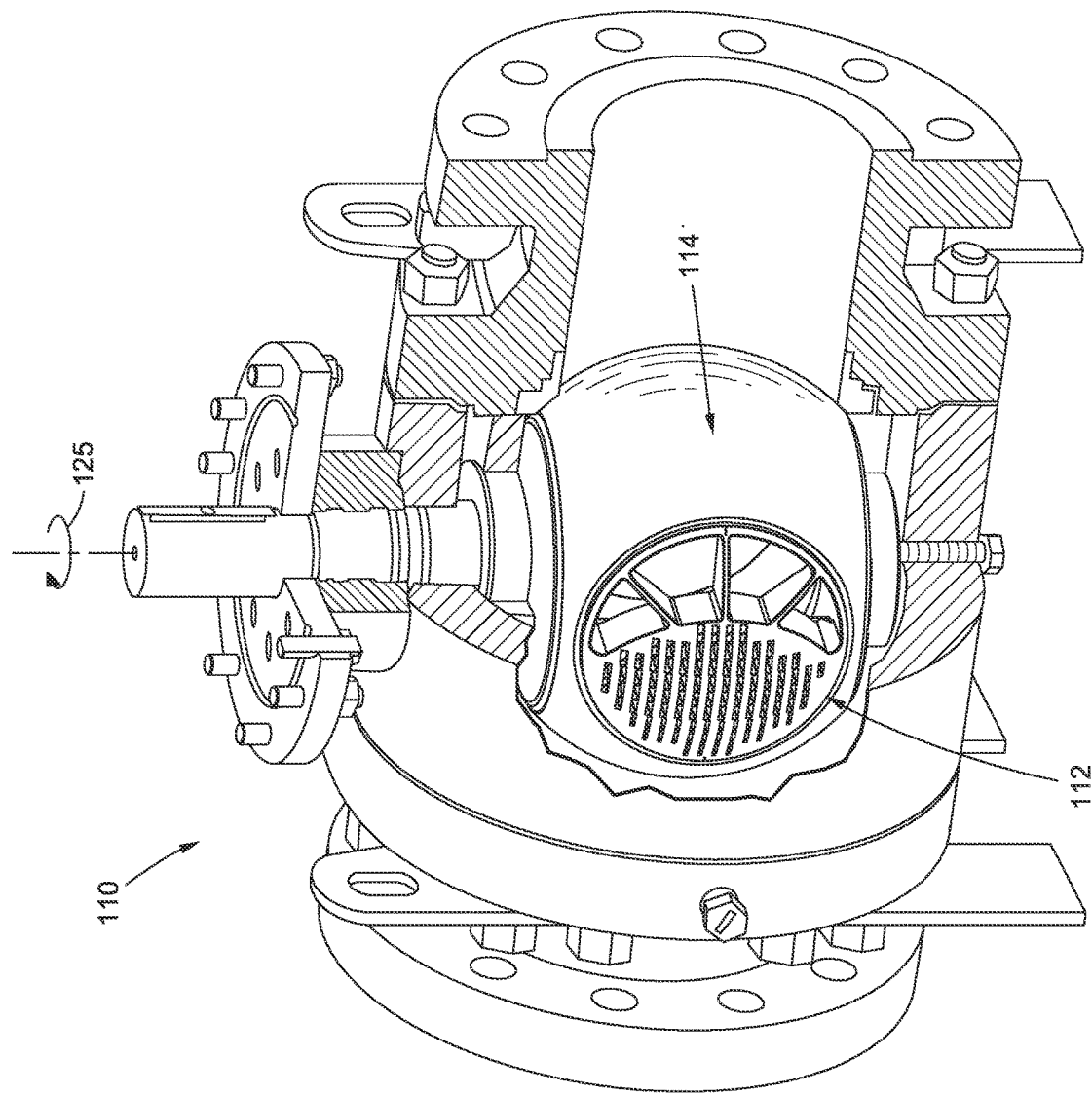
FIG. 21 is an upper perspective, partial cross-sectional view of another embodiment of a fluid control valve having a ball-type valve body and a flow control element integrated into ball-type valve body.

Although FIGS. 1 and 1A show a flow control element 12 positioned downstream of the valve body 14, and FIG. 21 shows a flow control element 112 integrated into a valve body 114, it is contemplated that certain embodiments may essentially include a combination of what is shown in FIGS. 1-1A and FIG. 21. In particular, a flow control valve may include a first flow control element integrated into a valve body, and a second flow control element positioned downstream of the valve body.

The particulars shown herein are by way of example only for purposes of illustrative discussion and are not presented in the cause of providing what is believed to be most useful and readily understood description of the principles and conceptual aspects of the various embodiments of the present disclosure. In this regard, no attempt is made to show any more detail than is necessary for a fundamental understanding of the different features of the various embodiments, the description taken with the drawings making apparent to those skilled in the art how these may be implemented in practice.

What is claimed is:

1. A fluid control valve comprising:
a valve housing having a fluid inlet and a fluid outlet;
a flow axis connecting the fluid inlet and the fluid outlet;
a valve body disposed within the valve housing and transitional relative to the valve housing between a fully open position and a closed position, in the closed position, the valve body preventing fluid flow between the fluid inlet and the fluid outlet, the valve body being incrementally transitional from the closed position to the fully open position to incrementally increase the amount of fluid flow from the fluid inlet to the fluid outlet; and
a flow control element positioned within the valve housing downstream of the valve body, the flow control element having:
a peripheral body defining an end surface and bisected by the flow axis;
a single-piece inward body at least partially surrounded by the peripheral body such that a common axis extending perpendicularly from the flow axis extends through portions of the inward body and the peripheral body, the inward body having a concave upstream surface which is complementary to an exterior profile of the valve body, a downstream surface opposite the upstream surface, and a plurality of multi-stage flow control passageways extending between the upstream and downstream surfaces, wherein adjacent stages in each of the multi-stage flow control passageways are separated by a turn or bend, the downstream surface having a stepped configuration including at least two regions which each define a surface segment which is generally parallel to the end surface, at least some of the multi-stage flow control passageways extending through the inward body between the upstream surface and the surface segment of each of the at least two regions; and
at least one opening collectively defined by the peripheral body and the inward body.

2. The fluid control valve recited in claim 1, wherein the valve body and flow control element are positioned relative to each other such that as the valve body transitions from the closed position toward the open position, fluid flows through at least one of the plurality of flow control passageways prior to fluid flow through the opening.

3. The fluid control valve recited in claim 1, wherein at each of the plurality of multi-stage flow control passageways is comprised of a plurality of segments, each segment being inclined 45 degrees relative to the flow axis.

4. The fluid control valve recited in claim 3, wherein each of the plurality of multi-stage flow control passageways includes a rectangular cross section in a plane perpendicular to the flow axis.

5. The fluid control valve recited in claim 3, wherein each of the plurality of multi-stage flow control passageways includes a first rectangular cross section in a first plane perpendicular to the flow axis and a second rectangular cross section in a second plane perpendicular to the flow axis, the second plane being downstream from the first plane and the second rectangular cross section being larger than the first rectangular cross section.

6. The fluid control valve recited in claim 1, wherein the downstream surface of the inward body of the flow control element includes three regions which each define a surface segment which is generally parallel to the end surface.

7. The fluid control valve recited in claim 1, wherein the multi-stage flow control passageways are formed to provide varying degrees of energy attenuating capacity, and are arranged so that those multi-stage flow control passageways exposed to fluid flow upon the initial opening of the valve body provide greater energy attenuating capacity than those multi-stage flow control passageways progressively exposed to fluid flow as the valve body continues to transition to the fully open position.

8. The fluid control valve recited in claim 1, wherein each of the plurality of multi-stage flow control passageways extends along a passageway axis which is parallel to the flow axis to define a respective length, the lengths of at least two of the plurality of multi-stage flow control passageways being different.

9. The fluid control valve recited in claim 1, wherein the flow control element is formed as a unitary structure.

10. A flow control element for use in a fluid control valve having a valve body disposed within a valve housing having a fluid inlet and a fluid outlet connected by a flow axis, and being transitional relative to the valve housing between a closed position and a fully open position, fluid flow through the fluid control valve incrementally increasing as the valve body incrementally transitions from the closed position toward the fully open position, the flow control element comprising:
a peripheral body defining an end surface and bisected by the flow axis when the flow control element is disposed within the valve housing; and
a single-piece inward body at least partially surrounded by the peripheral body such that when the flow control element is disposed within the valve housing, a common axis extending perpendicularly from the flow axis extends through portions of the inward body and the peripheral body, the inward body having a concave upstream surface which is complementary to an exterior profile of the valve body, a downstream surface opposite the upstream surface, and a plurality of multi-stage flow control passageways extending through the inward body between the upstream and downstream surfaces thereof, wherein adjacent stages in each of the multi-stage flow control passageways are separated by a turn or bend, the downstream surface having a stepped configuration including at least two regions which each define a surface segment which is generally parallel to the end surface, at least some of the multi-stage flow control passageways extending through the inward body between the upstream surface and the surface segment of each of the at least two regions;
the multi-stage flow control passageways being formed to provide varying degrees of energy attenuating capacity, and arranged within the inward body so that those multi-stage flow control passageways exposed to fluid flow upon the initial opening of the valve body provide greater energy attenuating capacity than those multi-stage flow control passageways progressively exposed to fluid flow as the valve body continues to transition to the fully open position.

11. The flow control element recited in claim 10, wherein the flow control element further comprises at least one opening collectively defined by the peripheral body and the inward body, the opening being arranged so that when the flow control element is disposed within the valve housing, the opening will be exposed to fluid flow subsequent to a majority of the multi-stage fluid control passageways being exposed to fluid flow as the valve body continues to transition to the fully open position.

12. The flow control element recited in claim 10, wherein each of the plurality of multi-stage flow control passageways is comprised of a plurality of segments, each segment being inclined 45 degrees relative to the flow axis when the flow control element is disposed within the valve housing.

13. The flow control element recited in claim 12, wherein each of the plurality of multi-stage flow control passageways includes a rectangular cross section in a plane perpendicular to the flow axis when the flow control element is disposed within the valve housing.

14. The flow control element recited in claim 12, wherein each of the plurality of multi-stage flow control passageways includes a first rectangular cross section in a first plane perpendicular to the flow axis when the flow control element is disposed within the valve housing, and a second rectangular cross section in a second plane perpendicular to the flow axis when the flow control element is disposed within the valve housing, the second plane being downstream from the first plane and the second rectangular cross section being larger than the first rectangular cross section.

15. The flow control element recited in claim 12, wherein each of the plurality of multi-stage flow control passageways extends along a passageway axis which is parallel to the flow axis when the flow control element is disposed within the valve housing to define a respective length, the lengths of at least two of the plurality of multi-stage flow control passageways being different.

16. The flow control element of claim 10, wherein the downstream surface includes three regions which each define of surface segment which is generally parallel to the end surface.

17. A fluid control valve comprising:
a valve housing having a fluid inlet and a fluid outlet;
a flow axis connecting the fluid inlet and the fluid outlet;
a valve body disposed within the valve housing and transitional relative to the valve housing between a closed position and a fully open position, in the closed position, the valve body preventing fluid flow between the fluid inlet and the fluid outlet, the valve body being incrementally transitional from the closed position to the open position to incrementally increase the amount of fluid flow from the fluid inlet to the fluid outlet; and
a flow control element positioned within the valve housing downstream of the valve body, the flow control element having:
an orifice plate having a concave upstream surface, a plurality of passage inlets formed therein and at least one flow opening formed therein;
a single-piece main body downstream of the orifice plate and having a plurality of multi-stage flow control passageways extending therethrough between opposed, generally planar first and second surfaces, wherein adjacent stages in each of the multi-stage flow control passageways are separated by a turn or bend, the main body being aligned with the orifice plate such that at least some of the plurality of passage inlets are in communication with respective ones of the multi-stage flow control passageways; and
a frame bisected by the flow axis and at least partially surrounding the main body such that a common axis extending perpendicularly from the flow axis extends through portions of the main body and the frame, the frame defining at least one opening in fluid communication with at least some of the plurality of passage inlets.

18. The fluid control valve recited in claim 17, wherein the main body includes an inlet face and an outlet face spaced from the inlet face along the flow axis, each of the plurality of multi-stage flow control passageways being comprised of a plurality of interconnected segments, each segment being inclined 45 degrees relative to the flow axis.

19. The fluid control valve recited in claim 18, wherein each of the plurality of multi-stage flow control passageways extends along a passageway axis which is parallel to the flow axis to define a respective length, the lengths of at least two of the plurality of multi-stage flow control passageways being different.

20. A flow control element for use in a fluid control valve having a valve body disposed within a valve housing having a fluid inlet and a fluid outlet connected by a flow axis, and being transitional relative to the valve housing between a closed position and a fully open position, fluid flow through the fluid control valve incrementally increasing as the valve body incrementally transitions from the closed position toward the fully open position, the flow control element comprising:
a peripheral body defining an end surface and bisected by the flow axis when the flow control element is disposed within the valve housing; and
a single-piece inward body at least partially surrounded by the peripheral body such that when the flow control element is disposed within the valve housing, a common axis extending perpendicularly from the flow axis extends through portions of the inward body and the peripheral body, the inward body having a concave upstream surface which is complementary to an exterior profile of the valve body, a downstream surface opposite the upstream surface, and a plurality of multi-stage flow control passageways extending through the inward body between the upstream and downstream surfaces thereof, wherein adjacent stages in each of the multi-stage flow control passageways are separated by a turn or bend, the downstream surface having a convex configuration creating thickness variations in the inward body which in turn create corresponding length variations in at least some of the multi-stage flow control passageways;
the multi-stage flow control passageways being formed to provide varying degrees of energy attenuating capacity, and arranged within the inward body so that those multi-stage flow control passageways exposed to fluid flow upon the initial opening of the valve body provide greater energy attenuating capacity than those multi-stage flow control passageways progressively exposed to fluid flow as the valve body continues to transition to the fully open position.

* * * * *